US009612791B2

(12) United States Patent
Yi et al.

(10) Patent No.: US 9,612,791 B2
(45) Date of Patent: Apr. 4, 2017

(54) METHOD, SYSTEM AND STORAGE MEDIUM FOR MONITORING AUDIO STREAMING MEDIA

(71) Applicant: Tencent Technology (Shenzhen) Company Limited, Shenzhen (CN)

(72) Inventors: Lifu Yi, Shenzhen (CN); Yun Zhang, Shenzhen (CN); Shenyuan Li, Shenzhen (CN); Jianfeng Chen, Shenzhen (CN); Bin Ma, Shenzhen (CN)

(73) Assignee: GUANGZHOU KUGOU COMPUTER TECHNOLOGY CO., LTD., Guangzhou (CN)

( * ) Notice: Subject to any disclaimer, the term of this patent is extended or adjusted under 35 U.S.C. 154(b) by 7 days.

(21) Appl. No.: 14/720,591

(22) Filed: May 22, 2015

(65) Prior Publication Data

US 2015/0286464 A1 Oct. 8, 2015

Related U.S. Application Data

(63) Continuation of application No. PCT/CN2013/086665, filed on Nov. 7, 2013.

(30) Foreign Application Priority Data

Nov. 22, 2012 (CN) .......................... 2012 1 0477360

(51) Int. Cl.
- G06F 3/16 (2006.01)
- G06F 17/30 (2006.01)

(Continued)

(52) U.S. Cl.
CPC ............ *G06F 3/165* (2013.01); *G06F 17/147* (2013.01); *G06F 17/30743* (2013.01);

(Continued)

(58) Field of Classification Search
CPC .. G06F 3/165; G06F 17/30743; G06F 17/147; H04L 65/60; H04L 65/605; H04L 65/4084; H04L 65/607

(Continued)

(56) References Cited

U.S. PATENT DOCUMENTS

| 2008/0091366 A1* | 4/2008 | Wang ..................... H04H 20/14 702/71 |
| 2010/0232500 A1* | 9/2010 | Lakus-Becker ......... H03M 7/30 375/240.12 |

(Continued)

FOREIGN PATENT DOCUMENTS

| CN | 101159834 A | 4/2008 |
| CN | 101615417 A | 12/2009 |

(Continued)

OTHER PUBLICATIONS

Review on Objective Music Structure Analysis: c 2009.*

(Continued)

*Primary Examiner* — Paul McCord
(74) *Attorney, Agent, or Firm* — Morgan, Lewis & Bockius LLP

(57) ABSTRACT

The present disclosure provides method and a computer system for tracking audio streaming media. The method includes: after streaming media information matching a currently played audio stream segment is identified, determining whether the streaming media information matches a next audio stream segment, and when the streaming media information matches the next audio stream segment, directly returning a result; or when the streaming media information does not match the next audio stream segment, performing streaming media information matching again for the next audio stream segment, which occupies less memory, (Continued)

improves a calculation speed, and reduces calculation complexity of matching the streaming media information.

12 Claims, 6 Drawing Sheets

(51) Int. Cl.
    *G06F 17/14*     (2006.01)
    *H04L 29/06*     (2006.01)

(52) U.S. Cl.
    CPC .......... *H04L 65/4084* (2013.01); *H04L 65/60* (2013.01); *H04L 65/605* (2013.01); *H04L 65/607* (2013.01)

(58) Field of Classification Search
    USPC ......................................................... 700/94
    See application file for complete search history.

(56) References Cited

U.S. PATENT DOCUMENTS

| | | | | |
|---|---|---|---|---|
| 2011/0082877 A1* | 4/2011 | Gupta | ............... | G10L 25/00 707/769 |
| 2012/0093327 A1* | 4/2012 | Jia | ............... | G10L 25/57 381/56 |
| 2014/0188487 A1* | 7/2014 | Perez Gonzalez | ...... | G10L 19/00 704/500 |
| 2014/0336798 A1* | 11/2014 | Emerson, III | ........ | G10L 19/018 700/94 |
| 2015/0193199 A1* | 7/2015 | Kim | ....................... | G06F 3/165 700/94 |

FOREIGN PATENT DOCUMENTS

| CN | 101651694 A | 2/2010 |
|---|---|---|
| CN | 102024033 A | 4/2011 |

OTHER PUBLICATIONS

Tencent Technology, ISR, PCT/CN2013/086665, Jan. 30, 2014, 3 pgs.

Tencent Technology, Written Opinion, PCT/CN2013/086665, Jan. 30, 2014, 15 pgs.

Tencent Technology, IPRP, PCT/CN2013/086665, May 26, 2015, 8 pgs.

* cited by examiner

METHOD, SYSTEM AND STORAGE MEDIUM FOR MONITORING AUDIO STREAMING MEDIA

RELATED APPLICATIONS

This application is a continuation application of PCT Patent Application No. PCT/CN2013/086665, entitled "METHOD, SYSTEM, AND STORAGE MEDIUM FOR TRACKING AUDIO STREAMING MEDIA" filed on Nov. 7, 2013, which claims priority to Chinese Patent Application No. 201210477360.1, filed with the Chinese Patent Office on Nov. 22, 2012 and entitled "METHOD, SYSTEM, AND STORAGE MEDIUM FOR TRACKING AUDIO STREAMING MEDIA", both of which are incorporated herein by reference in their entirety.

FIELD OF THE TECHNOLOGY

The present disclosure relates to the field of audio processing technologies, and in particular, to a method and a computer system for tracking audio streaming media, and a storage medium.

BACKGROUND OF THE DISCLOSURE

Currently, when a user listens to streaming media (such as a song from a radio station), because a piece of complete streaming media needs to be played for a period of time (for example, 3 to 4 minutes), how to continuously track streaming media in a playback process to display accurate streaming media information in real time is particularly important. In the existing technology, streaming media may be tracked by using an audio fingerprint technology. An audio fingerprint refers to a content-based compact digital signature that may represent important acoustic features of a piece of music. The audio fingerprint technology generally includes two parts: a fingerprint extraction algorithm for calculating important auditory features and a fingerprint comparison algorithm for performing effective searching in a fingerprint database. When an unknown audio needs to be identified, audio features of the unknown audio are calculated first according to the fingerprint extraction algorithm, and comparison is then performed according to the fingerprint comparison algorithm between the audio features and a large number of audio fingerprints stored in the fingerprint database, to identify a corresponding audio. An effective audio fingerprint technology can be used to correctly identify, in the database, an original version of a distorted unknown audio on which various signal processing may be performed.

An objective of an audio fingerprint system is to search for a corresponding audio by receiving an audio signal and using a pre-constructed audio fingerprint database, to identify a predetermined audio. According to application fields, the audio fingerprint system is used for broadcast monitors, CF identification, and file filtering. In order to effectively use the audio fingerprint system in the application fields, even in various distortion situations, a high identification rate and a high searching speed are also needed. Specifically, in order to filter a file in a P2P field or a UCC field, audio fingerprint data formed by hundreds of thousands of audio files each of which has its own copyright needs to be quickly and accurately searched for. For real-time processing in a broadcast monitoring field and a file filtering field in which operations are performed based on a high-capacity audio fingerprint database, the identification speed is one of the most important factors.

In the existing technology, tracking streaming media by using an audio fingerprint technology includes: first performing framing on an audio signal of an audio segment; then determining a key frame based on a start point detection algorithm, extracting an audio fingerprint of the key frame, correspondingly storing the audio fingerprint and streaming media information of the key frame into a hash table, inputting, by a user, the audio segment to search for the audio fingerprint, and obtaining the audio fingerprint based on the audio signal of the audio segment; and then matching corresponding streaming media information from the hash table according to the audio fingerprint, and obtaining streaming media information including the audio segment, to implement identification of streaming media. In a streaming media playback process, the audio fingerprint matching needs to be continuously performed until the streaming media playback is ended. According to the foregoing manner of tracking streaming media, after streaming media is identified, audio fingerprint matching, being a calculation wasting time and energy, is still continuously performed, which greatly consumes calculation resources and memory resources. Generally, a response time of searching is long (for example, one second). In addition, such a matching calculation is continuously performed, and if there is a slight difference between two matching results (because a situation of repeated streaming media of which a name and a name of a singer are slightly different exists), complexity of streaming media identification (such as result ranking) may further be increased.

Therefore, it is necessary to put forward a new technical solution, so as to solve the foregoing technical problem that in the foregoing manner of tracking streaming media, after streaming media is identified, audio fingerprint matching is still continuously performed, which wastes calculation resources and memory resources and increases complexity of streaming media identification.

SUMMARY

An embodiment of the present disclosure is to provide a method and a computer system for tracking streaming media, which aim to solve a technical problem of tracking streaming media in the existing technology, after streaming media is identified, audio fingerprint matching is still continuously performed, which wastes calculation resources and memory resources and increases complexity of streaming media identification.

In order to achieve the foregoing objective, an embodiment of the present disclosure provides a method for tracking audio streaming media performed at a computer having a display, one or more processors and memory for storing a plurality of program modules to be executed by the one or more processors, the method including:

segmenting an audio stream into at least two audio stream segments, two consecutive segments separated by a time interval;

identifying first streaming media information corresponding to a currently played audio stream segment by using its audio fingerprint, and using the first streaming media information for representing the currently played audio stream segment, the audio fingerprint being a content-based digital signature representing an acoustic feature of the currently played audio stream segment;

displaying the first streaming media information;

calculating a Hamming distance between an audio fingerprint of a next audio stream segment and the audio fingerprint of the first streaming media information, so as to obtain a matching degree between the next audio stream segment and the first streaming media information;

determining whether the matching degree is greater than a preset threshold;

when the matching degree is less than the preset threshold, identifying second streaming media information corresponding to the next audio stream segment; and when the matching degree is greater than the preset threshold, choosing the first streaming media information as the second streaming media information; and replacing the first streaming media information displayed on an interface with the second streaming media information.

In order to achieve the foregoing objective, an embodiment of the present disclosure provides a method for tracking audio streaming media, including:

segmenting an audio stream into at least two audio stream segments, two consecutive segments separated by a time interval;

identifying first streaming media information corresponding to a currently played audio stream segment by using its audio fingerprint, and using the first streaming media information for representing the currently played audio stream segment;

determining whether a matching degree between a next audio stream segment and the first streaming media information is greater than a preset threshold;

when the matching degree is less than the preset threshold, identify second streaming media information corresponding to the next audio stream segment; and when the matching degree is greater than the preset threshold, choosing the first streaming media information as the second streaming media information.

In order to achieve the foregoing objective, an embodiment of the present disclosure provides a computer system for tracking audio streaming media including one or more processors, a display, memory, and a plurality of program modules stored in the memory and to be executed by the one or more processors, the plurality of program modules further including:

an audio processing module, configured to segment an audio stream into at least two audio stream segments, two consecutive segments separated by a time interval;

an information matching module, configured to identify first streaming media information corresponding to a currently played audio stream segment by using its audio fingerprint, and using the first streaming media information for representing the currently played audio stream segment;

a matching degree determining module, configured to determine whether a matching degree between a next audio stream segment and the first streaming media information is greater than a preset threshold, the information matching module being further configured to: when the matching degree is less than the preset threshold, identify second streaming media information corresponding to the next audio stream segment; and the information matching module being further configured to: when the matching degree is less than the preset threshold, identify second streaming media information corresponding to the next audio stream segment; and a result returning module, configured to: when the matching degree is greater than the preset threshold, choose the first streaming media information as the second streaming media information.

In order to achieve the foregoing objective, an embodiment of the present disclosure provides a non-transitory computer readable storage medium, internally storing a processor executable instruction, the processor executable instruction being used for enabling a processor to perform the following operations:

segmenting an audio stream into at least two audio stream segments, two consecutive segments separated by a time interval;

identifying first streaming media information corresponding to a currently played audio stream segment by using its audio fingerprint, and using the first streaming media information for representing the currently played audio stream segment;

determining whether a matching degree between a next audio stream segment and the first streaming media information is greater than a preset threshold;

when the matching degree is less than the preset threshold, identify second streaming media information corresponding to the next audio stream segment; and when the matching degree is greater than the preset threshold, choosing the first streaming media information as the second streaming media information.

According to the method and the system for tracking audio streaming media in the embodiments of the present disclosure, after streaming media is identified, it is determined whether current streaming media is previous matching streaming media, and if the current streaming media is the previous matching streaming media, a result may be directly returned; or if the current streaming media is not the previous matching streaming media, streaming media matching is performed again. Because a fingerprint of the current streaming media only needs to match a fingerprint of the previous streaming media, occupied memory is less, a calculation speed is improved, not only calculation complexity of streaming media matching is greatly reduced, but also a stable streaming media matching result can be achieved, a situation that a matching result displayed to a user is unstable is effectively avoided, and matching accuracy is improved; effects of an external audio on streaming media matching accuracy in a streaming media playback process can be effectively reduced, and user experience is improved.

In order to make the foregoing content of the present disclosure more comprehensible, the following is described in detail with reference to the accompanying drawings by using preferred embodiments.

DESCRIPTION OF EMBODIMENTS

Figure 1:
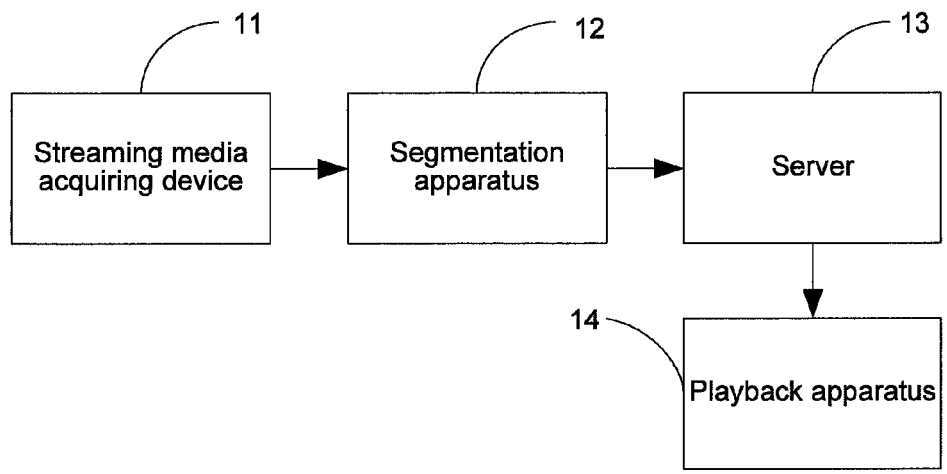
FIG. 1 is a schematic diagram of an operating environment of a method for tracking audio streaming media according to an embodiment of the present disclosure.

Referring to the drawings, same component symbols represent same components. A principle of the present disclosure is described by using examples in which the present disclosure is implemented in proper computing environments. The following descriptions are specific embodiments of the present disclosure based on the examples, and should not be construed as a limitation to other specific embodiments of the present disclosure that are not described herein in detail.

In the description that follows, the present disclosure will be described with reference to steps and symbolic representations of operations that are performed by one or more computers, unless indicated otherwise. As such, such steps and operations are at times referred to as being computer-executed, and being computer-executed referred to as in the specification includes the operation by the processing unit of the computer of electrical signals representing data in a structured form. This operation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the principle of the present disclosure is being described in the foregoing context, it is not meant to be limiting as those of skill in the art will appreciate that the various steps and operations described hereinafter may also be implemented in hardware.

The principle of the present disclosure is performed by using many other general-purpose or specific-purpose operations, communications environment, or configurations. A known example which is suitable for being applied to a calculation system, an environment, and a configuration of the present disclosure may include (but is not limited to) a mobile phone, a personal computer, a server, a multiprocessor system, a microcomputer dedicated system, a host architecture type computer, and a distributed calculation environment, which include any one of the foregoing systems or apparatuses.

A term "module" used in the specification may be regarded as a software object executed in the calculation system. Different components, modules, engines, and services described in the specification may be regarded as objects implemented in the calculation system. The apparatus and method described in the specification is preferably implemented in a form of software, and definitely can be implemented in a form of hardware, both of which fall within the protection scope of the present disclosure.

FIG. 1 is a schematic diagram of an operating environment of a method for tracking audio streaming media according to an embodiment of the present disclosure, where the operating environment includes a streaming media acquiring device 11, a segmentation apparatus 12, a server 13, and a playback apparatus 14. The streaming media acquiring device 11 is configured to acquire audio streaming media, where the streaming media acquiring device 11 is, for example, a microphone, and the streaming media acquiring device 11 may acquire the audio streaming media from a radio station. The streaming media acquiring device 11 transmits the acquired audio streaming media to the segmentation apparatus 12. The segmentation apparatus 12 segments the received streaming media into at least two audio stream segments. The server 13 receives and stores the streaming media segments that are sent by the segmentation apparatus 12 and are based on the HLS protocol. The playback apparatus 14 continuously downloads an audio stream segment from the server 13 and plays the audio stream segment.

The playback apparatus 14 may not only be formed by a desktop computer, but also be formed by a terminal that has a storage unit, has a microprocessor installed therein, and can play streaming media, such as a notebook computer, a workstation, a palmtop computer, a ultra mobile personal computer (UMPC), a tablet personal computer (PC), a personal digital assistant (PDA), a web pad, and a portable phone.

Figure 2:
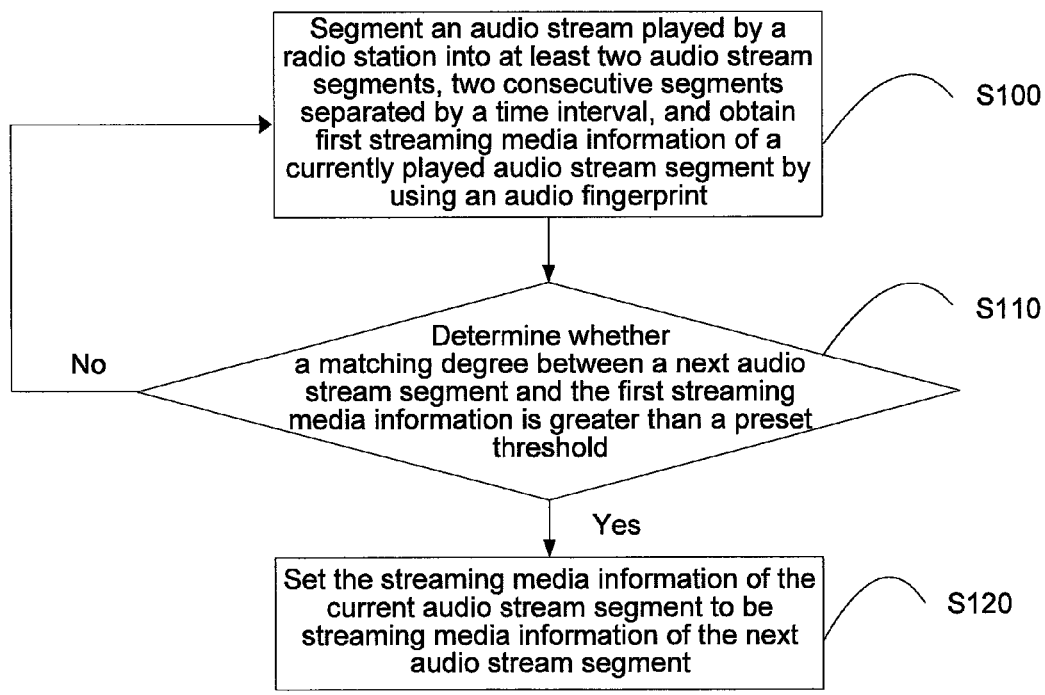
FIG. 2 is a flowchart of a method for tracking audio streaming media according to a first embodiment of the present disclosure.

FIG. 2 is a flowchart of a method for tracking audio streaming media according to a first embodiment of the present disclosure. The method for tracking audio streaming media according to the first embodiment of the present disclosure includes the following steps:

Step S100: Segment an audio stream played by a radio station into at least two audio stream segments, two consecutive segments separated by a time interval, and obtain first streaming media information of a currently played audio stream segment by using an audio fingerprint.

In step S100, the time interval between the audio stream segments may be set according to a practical application. In this embodiment of the present disclosure, the time interval between the audio stream segments is 10 seconds. A manner of identifying the first streaming media information of the currently played audio stream segment includes: performing framing process on an audio signal of the currently played audio stream segment, to obtain multiple framing spectrum diagrams; detecting, by using a start point detection algorithm, whether any framing spectrum diagram is a key frame, reserving a framing spectrum diagram corresponding to the key frame, and discarding framing spectrum diagrams corresponding to non-key frames; and obtaining an audio fingerprint of the key frame, by means of calculation according to streaming media information corresponding to the audio fingerprint of the key frame, first streaming media information including the currently played audio stream segment, and returning a matching result.

Step S110: Determine whether a matching degree between a next audio stream segment and the first streaming media information is greater than a preset threshold; when the matching degree between the next audio stream segment and the first streaming media information is less than the preset threshold, and perform step S100 again to identify second streaming media information of the next audio stream segment; and when a matching degree between the next audio stream segment and the first streaming media information is greater than the preset threshold, perform step S120.

In step S110, after a piece of matching streaming media is obtained, when the streaming media is tracked subsequently, it only needs to be determined whether the current streaming media is previous matching streaming media, and if the current streaming media is the previous matching streaming media, a result may be directly returned; or if the current streaming media is not the previous matching streaming media, streaming media matching is performed again. Because a fingerprint of the current streaming media only needs to match a fingerprint of the previous streaming media, occupied memory is less, a calculation speed is improved, not only calculation complexity of streaming media matching is greatly reduced, but also a stable streaming media matching result can be achieved, and a situation that a matching result displayed to a user is unstable is effectively avoided. For example, when matching is performed on a same piece of streaming media, former and latter matching results are changed frequently, which improves matching accuracy; in addition, effects of an external audio on matching accuracy of streaming media in a streaming media playback process can be effectively reduced, such as an occasional talk of a moderator or a brief advertisement during playback of streaming media. A determining manner of determining whether the matching degree between the next audio stream segment and the first streaming media information of the currently played audio stream segment is greater than the preset threshold is: calculating a Hamming distance between an audio fingerprint of the next audio stream segment and an audio fingerprint of the first streaming media information corresponding to the currently played audio stream segment, to obtain the matching degree between the next audio stream segment and the first streaming media information corresponding to the currently played audio stream segment.

Step S120: Set the streaming media information of the current audio stream segment to be streaming media information of the next audio stream segment.

Figure 3:
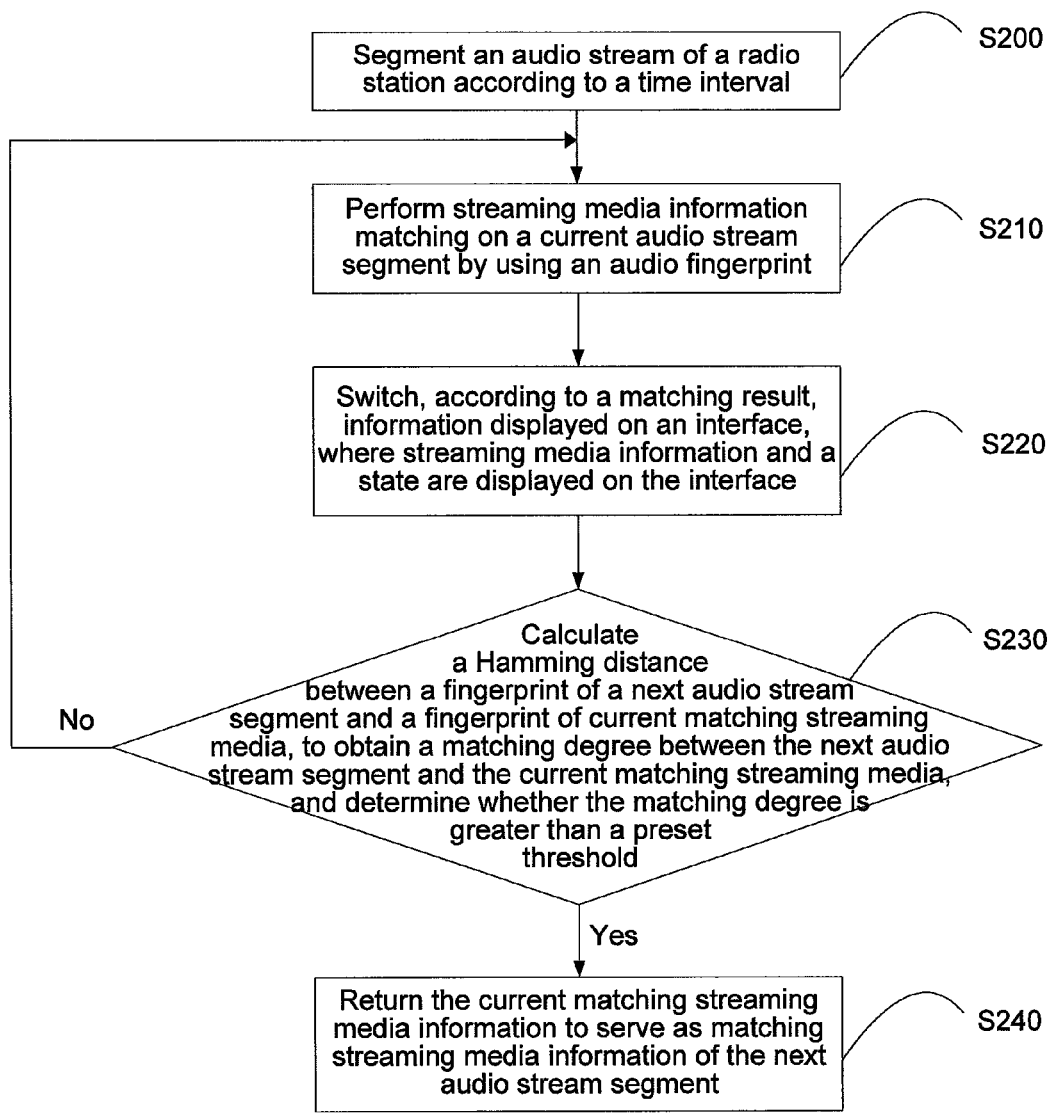
FIG. 3 is a flowchart of a method for tracking audio streaming media according to a second embodiment of the present disclosure.

FIG. 3 is a flowchart of a method for tracking audio streaming media according to a second embodiment of the present disclosure. The method for tracking audio streaming media according to the second embodiment of the present disclosure includes the following steps:

Step S200: Segment an audio stream of a radio station into at least two audio stream segments, two consecutive segments separated by a time interval. In step S200, the time interval between the two audio stream segments may be set according to a practical application, and in this embodiment of the present disclosure, the time interval between the audio stream segments is 10 seconds.

Step S210: Perform streaming media information matching on a currently played audio stream segment by using an audio fingerprint, to obtain first streaming media information corresponding to the currently played audio stream segment. In step S210, refer to FIG. 4, which is a flowchart of a manner of streaming media information matching an audio stream segment in the present disclosure. The manner of streaming media information matching an audio stream segment in the present disclosure includes the following steps:

Step S211: Randomly extract a spectrum diagram, which has a window length of 11.6*w milliseconds, of an audio signal of the currently played audio stream segment every d/N milliseconds averagely, to obtain multiple framing spectrum diagrams.

Step S212: Detect, by using a start point detection algorithm, whether each framing spectrum diagram is a key frame, reserve a framing spectrum diagram corresponding to the key frame, and discard framing spectrum diagrams of non-key frames. In step S212, the step of detecting, by using a start point detection algorithm, whether each framing spectrum diagram corresponds to a key frame is specifically: performing fast Fourier transformation (FFT)+linear predictive coding (LPC) on subframes obtained after framing process, to determine a key frame in the subframes.

Step S213: Perform short discrete cosine transform (DCT) on the key frame, and reserve a main DCT coefficient.

Step S214: Represent the reserved DCT coefficient by using a binary system.

Step S215: Convert, by using a minimum hash algorithm, the DCT coefficient represented by using the binary system into the audio fingerprint. In step S215, random arrangement manners of the minimum hash algorithm are the same when the audio fingerprint is stored and queried for.

Step S216: Divide the audio fingerprint into a preset number of audio sub-fingerprints stored in one hash sub-table by using a locality sensitive hashing (LSH) algorithm, where the preset number is, for example, bin (b), store the b audio sub-fingerprints into the hash sub-table, and find an adjacent matching audio sub-fingerprint by calculating the numbers of occurrences of the audio sub-fingerprints. In step S216, "ABCDEFGHIJKLMNOPQRSTUVWXY" shown in FIG. 4 indicates an extracted audio fingerprint, and "ABCDE", "EFGHI", . . . , and "UVWXY" separately indicate audio sub-fingerprints obtained by dividing the audio fingerprint.

Figure 5:
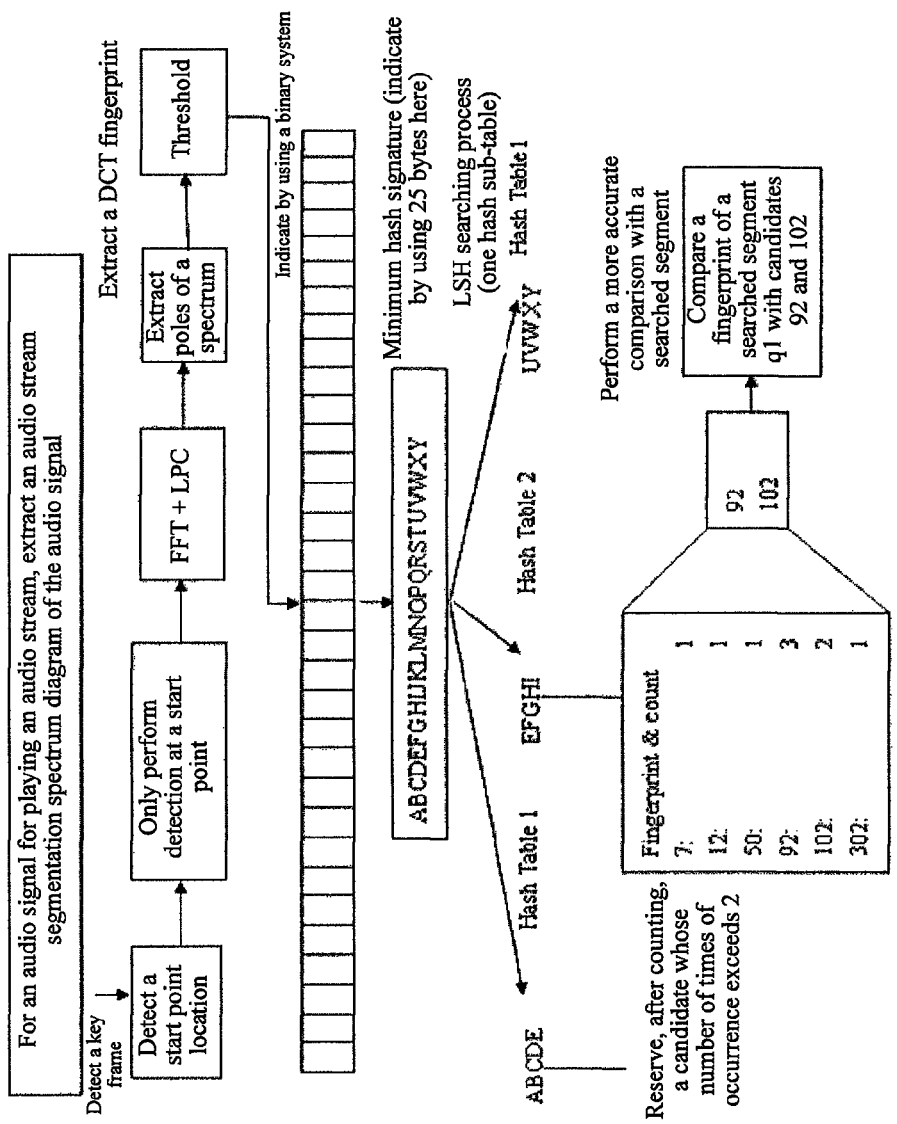
FIG. 5 is an operating principle diagram of a manner of streaming media information matching an audio stream segment according to the present disclosure.

Step S217: Discard an audio sub-fingerprint whose number of occurrences is less than a matching threshold. In step S217, as shown in FIG. 5, in the hash sub-table, the numbers of occurrences of the audio sub-fingerprint in audio file information 7, 12, 50, 92, 102, and 302 are 1, 1, 1, 3, 2, and 1 respectively. Assuming that a current preset matching threshold is 2, audio sub-fingerprints corresponding to the audio file information 92 and 102 are adjacent matching audio sub-fingerprints.

Step S218: Compare an audio fingerprint of the currently played audio stream segment with reserved audio sub-fingerprints, and obtain, by means of calculation, a matching error according to a Hamming distance between the reserved audio sub-fingerprints and the audio fingerprint of the audio stream segment, to acquire an accurate matching audio sub-fingerprint.

Step S219: Combine, on a timeline by using a dynamic programming algorithm or a straight line detection algorithm, streaming media information corresponding to the accurate matching audio sub-fingerprint, to obtain the first streaming media information including the currently played audio stream segment, and return a matching result.

Figure 7:
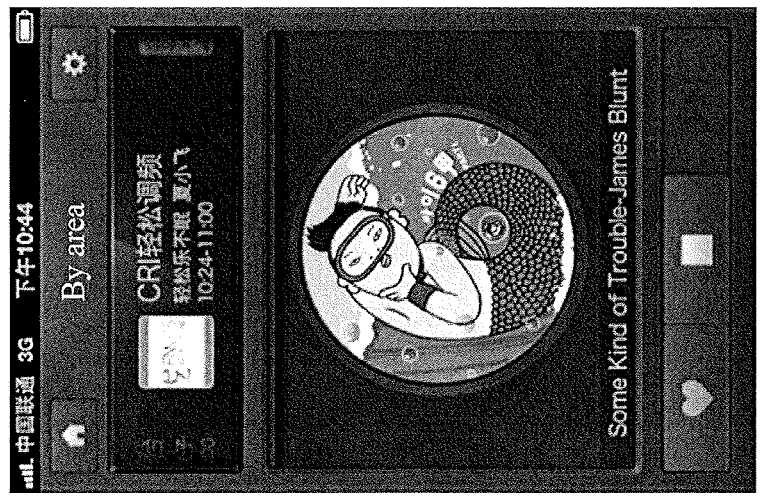
FIG. 7 is a schematic diagram of a state of displaying matching streaming media information according to the present disclosure.
Figure 6:
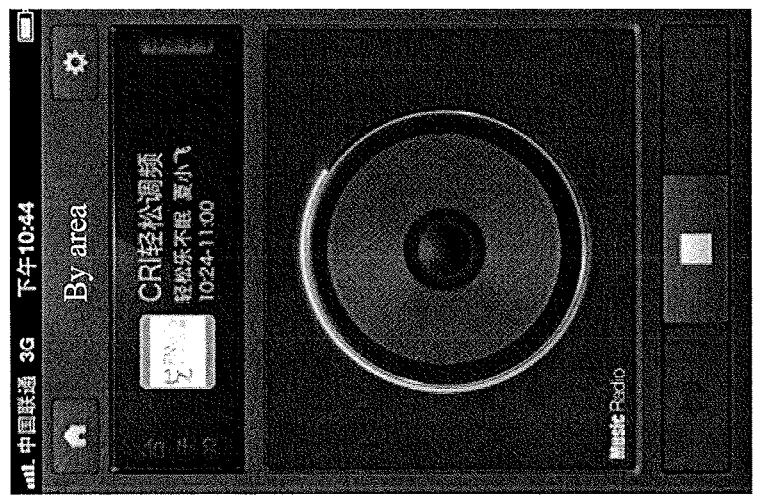
FIG. 6 is a schematic diagram of a state of skipping obtaining streaming media after matching according to the present disclosure.

Step S220: Switch, according to the matching result, information displayed on an interface, where the first streaming media information and a state are displayed on the interface. FIG. 6 is a schematic diagram of a state of skipping matching streaming media according to the present disclosure. FIG. 7 is a schematic diagram of a state of displaying matching streaming media information (such as first streaming media information or second streaming media information) according to the present disclosure. According to a change of a local area of a playback interface, a user quickly identifies whether there is a matching result currently, to improve use experience.

Step S230: Calculate a Hamming distance between the audio fingerprint of the next audio stream segment and an audio fingerprint of the first streaming media information of the currently played audio stream segment, to obtain a matching degree between the next audio stream segment and the first streaming media information, determine whether the matching degree is greater than the preset threshold, and when the matching degree is greater than the preset threshold, perform step S240; or when the matching degree is less than the preset threshold, stop displaying of the first streaming media information, and perform step S210 again.

In step S230, after a piece of matching streaming media is obtained, when the streaming media is tracked subsequently, it only needs to be determined whether the current streaming media is previous matching streaming media, and if the current streaming media is the previous matching streaming media, a result may be directly returned; or if the current streaming media is not the previous matching streaming media, streaming media matching is performed again. Because a fingerprint of the current streaming media only needs to match a fingerprint of the previous streaming media, occupied memory is less, a calculation speed is improved, not only calculation complexity of streaming media matching is greatly reduced, but also a stable streaming media matching result can be achieved, and a situation that a matching result displayed to a user is unstable is effectively avoided, for example, when matching is performed on a same piece of streaming media, former and latter matching results are changed frequently, which improves matching accuracy; in addition, effects of an external audio on matching accuracy of streaming media in a streaming media playback process can be effectively reduced, such as an occasional talk of a moderator or a brief advertisement during playback of streaming media.

Step S240: Return streaming media information of the currently played audio stream segment to serve as second streaming media information of the next audio stream segment, and switch matching streaming media information on the interface.

Figure 8:
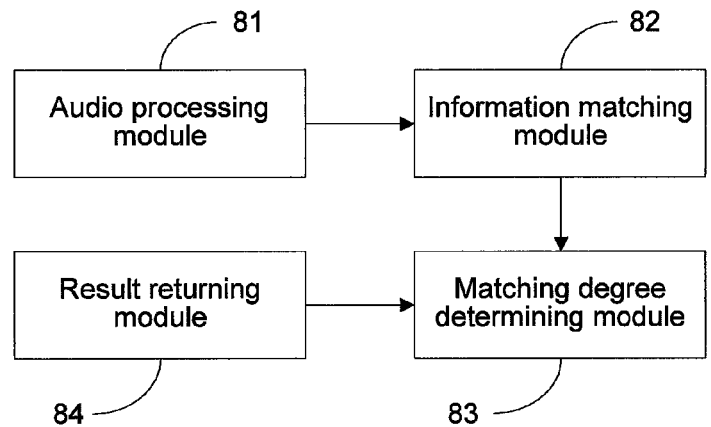
FIG. 8 is a schematic structural diagram of a system for tracking audio streaming media according to a first embodiment of the present disclosure.

Refer to FIG. 8, which is a schematic structural diagram of a computer system for tracking audio streaming media according to a first embodiment of the present disclosure. The system for tracking audio streaming media according to the first embodiment of the present disclosure includes:

an audio processing module 81, configured to segment an audio stream into at least two audio stream segments, two consecutive segments separated by a time interval, where the time interval between the audio stream segments may be set according to a practical application, and in this embodiment of the present disclosure, the time interval between the audio stream segments is 10 seconds;

an information matching module 82, configured to perform streaming media information matching on a currently played audio stream segment by using an audio fingerprint, to obtain corresponding first streaming media information, where a manner of identifying the first streaming media information of the currently played audio stream segment includes: performing framing process on an audio signal of the currently played audio stream segment, to obtain multiple framing spectrum diagrams; detecting, by using a start point detection algorithm, whether each framing spectrum diagram is a key frame, reserving a framing spectrum diagram corresponding to the key frame, and discarding framing spectrum diagrams corresponding to non-key frames; and obtaining an audio fingerprint of the key frame, obtaining, by means of calculation according to streaming media information corresponding to the audio fingerprint of the key frame, the first streaming media information including the currently played audio stream segment, and returning a matching result;

a matching degree determining module 83, configured to determine whether a matching degree between a next audio stream segment and the first streaming media information of the currently played audio stream segment is greater than a preset threshold, if the matching degree is less than the preset threshold, end displaying of the first streaming media information, and match streaming media information again by using the information matching module 82; or if the matching degree is greater than the preset threshold, return, by using a result returning module 84, matching streaming media of the next audio stream segment, where the matching streaming media is used as streaming media information matching the currently played audio stream segment, where after a piece of matching streaming media is obtained, when the streaming media is tracked subsequently, it only needs to be determined whether the current streaming media is previous matching streaming media, and if the current streaming media is the previous matching streaming media, a result may be directly returned; or if the current streaming media is not the previous matching streaming media, streaming media matching is performed again; because a fingerprint of the current streaming media only needs to match a fingerprint of the previous streaming media, occupied memory is less, a calculation speed is improved, not only calculation complexity of streaming media matching is greatly reduced, but also a stable streaming media matching result can be achieved, and a situation that a matching result displayed to a user is unstable is effectively avoided, for example, when matching is performed on a same piece of streaming media, former and latter matching results are changed frequently, which improves matching accuracy; in addition, effects of an external audio on matching accuracy of streaming media in a streaming media playback process can be effectively reduced, such as an occasional talk of a moderator or a brief advertisement during playback of streaming media; and a determining manner of determining whether the matching degree between the next audio stream segment and streaming media information matching a previous audio stream segment is greater than the preset threshold is: calculating a Hamming distance between a fingerprint of the next audio stream segment and an audio fingerprint of the streaming media information matching the previous audio stream segment, to obtain the matching degree between the next audio stream segment and the streaming media information matching the previous audio stream segment; and the result returning module 84, configured to set second streaming media information (the matching streaming media information) of the next audio stream segment to streaming media information matching the currently played audio stream segment.

Figure 9:
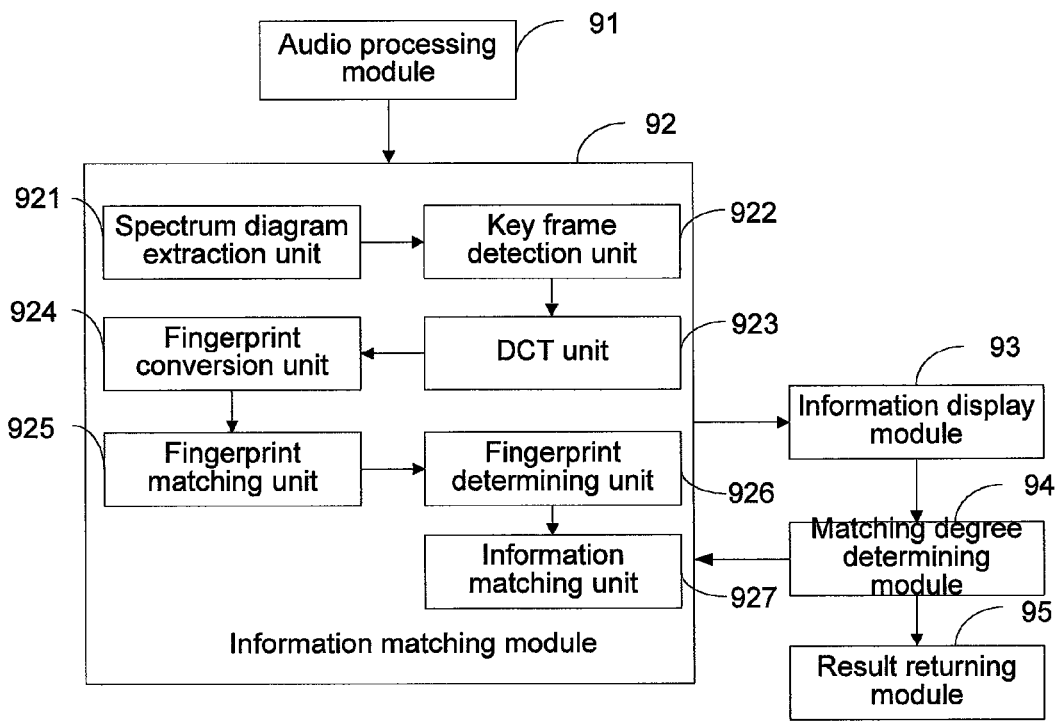
FIG. 9 is a schematic structural diagram of a system for tracking audio streaming media according to a second embodiment of the present disclosure.

FIG. 9 is a schematic structural diagram of a computer system for tracking audio streaming media according to a second embodiment of the present disclosure. The system for tracking audio streaming media according to the second embodiment of the present disclosure includes an audio processing module 91, an information matching module 92, an information display module 93, a matching degree determining module 94, and a result returning module 95.

The audio processing module 91 is configured to segment an audio stream into at least two audio stream segments, two consecutive segments separated by a time interval, where the time interval between the audio stream segments may be set according to a practical application, and in this embodiment of the present disclosure, the time interval between the audio stream segments is 10 seconds.

Figure 4:
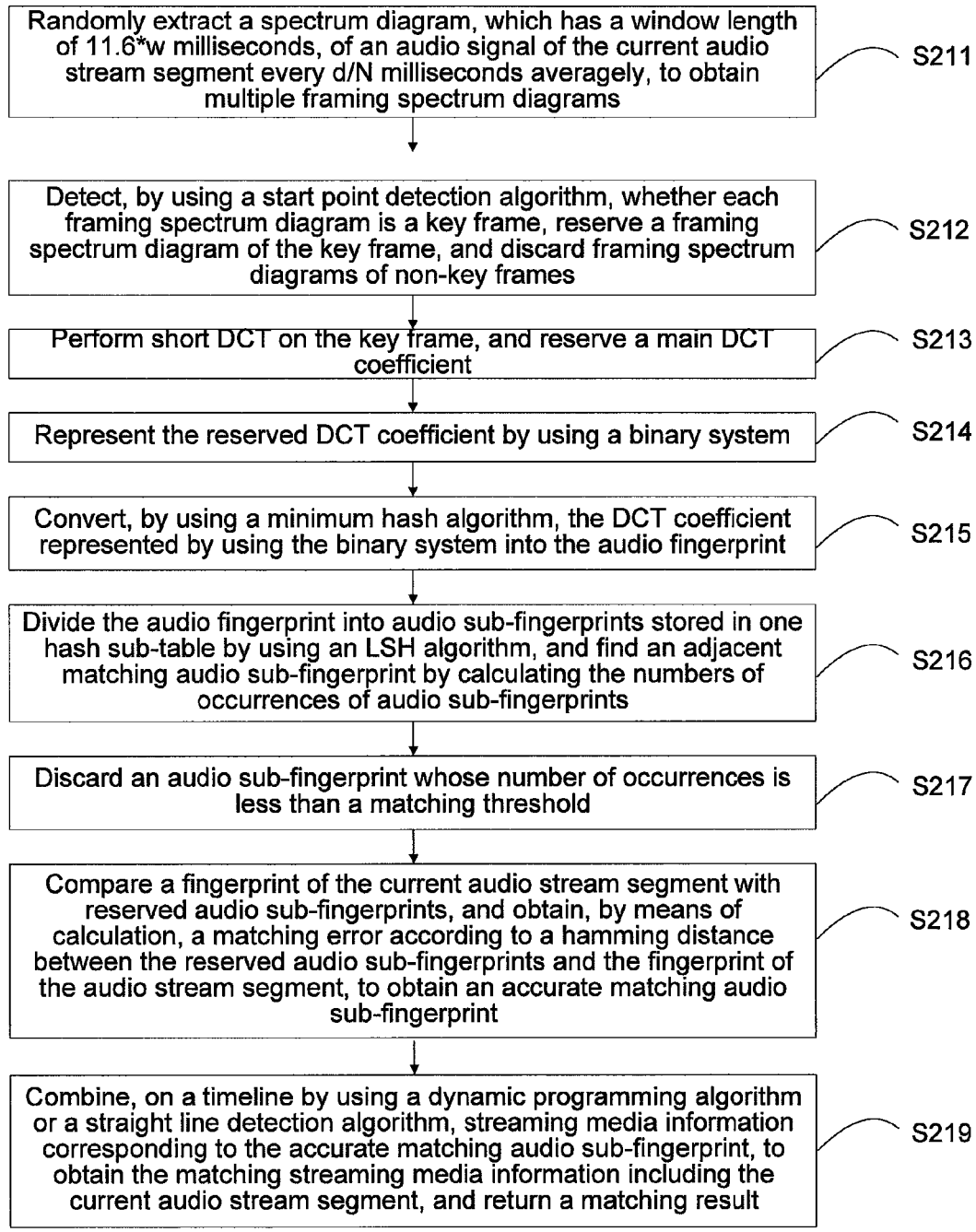
FIG. 4 is a flowchart of a manner of streaming media information matching an audio stream segment according to the present disclosure.

The information matching module 92 is configured to perform streaming media information matching on a currently played audio stream segment by using an audio fingerprint, to obtain corresponding first streaming media information, and, specifically, the information matching module 92 further includes:

a spectrum diagram extraction unit 921, configured to randomly extract a spectrum diagram, which has a window length of 11.6*w milliseconds, of an audio signal of a current audio stream segment every d/N milliseconds averagely, to obtain multiple framing spectrum diagrams;

a key frame detection unit 922, configured to detect, by using a start point detection algorithm, whether each framing spectrum diagram is a key frame, reserve a framing spectrum diagram corresponding to the key frame, and discard framing spectrum diagrams of non-key frames, where the step of detecting, by using a start point detection algorithm, whether each framing spectrum diagram corresponds to a key frame is specifically: performing FFT+LPC on subframes obtained after framing process, to determine a key frame in the subframes;

a DCT unit 923, configured to perform short DCT on the key frame, reserve a main DCT coefficient, and represent the reserved DCT coefficient by using a binary system;

a fingerprint conversion unit 924, configured to convert, by using a minimum hash algorithm, the DCT coefficient represented by using the binary system into the audio fingerprint, where random arrangement manners of the minimum hash algorithm are the same when the audio fingerprint is stored and queried for;

a fingerprint matching unit 925, configured to divide the audio fingerprint into b audio sub-fingerprints and one hash sub-table by using an LSH algorithm, store the b audio sub-fingerprints into the hash sub-table, find an adjacent matching audio sub-fingerprint by calculating the numbers of occurrences of the audio sub-fingerprints, and discard an audio sub-fingerprint whose number of occurrences is less than a matching threshold, where "ABCDEFGHIJKLM-NOPQRSTUVWXY" shown in FIG. 4 indicates an extracted audio fingerprint, and "ABCDE", "EFGHI", . . . , and "UVWXY" separately indicate audio sub-fingerprints obtained by dividing the audio fingerprint; as shown in FIG. 4, in the hash sub-table, the numbers of occurrences of the audio sub-fingerprint in audio file information 7, 12, 50, 92, 102, and 302 are 1, 1, 1, 3, 2, and 1 respectively, and assuming that a current preset matching threshold is 2, audio sub-fingerprints corresponding to the audio file information 92 and 102 are adjacent matching audio sub-fingerprints;

a fingerprint determining unit 926, configured to compare a fingerprint of the current audio stream segment with the reserved audio sub-fingerprint, and obtain, by means of calculation, a matching error according to a Hamming distance between the reserved audio sub-fingerprint and the fingerprint of the audio stream segment, to obtain an accurate matching audio sub-fingerprint; and an information matching unit 927, configured to combine, on a timeline by using a dynamic programming algorithm or a straight line detection algorithm, streaming media information corresponding to the accurate matching audio sub-fingerprint, to obtain matching streaming media information including the current audio stream segment, and return a matching result.

The information display module 93 is configured to switch, according to the matching result, information displayed on an interface, and display the streaming media information and a state on the interface. For a specific streaming media display effect, refer to FIG. 6 and FIG. 7. FIG. 6 is a schematic diagram of a state of skipping obtaining streaming media after matching according to the present disclosure. FIG. 7 is a schematic diagram of a state of displaying matching streaming media information according to the present disclosure. According to a change of a local area of a playback interface, a user quickly identifies whether there is a matching result currently, to improve use experience.

The matching degree determining module 94 is configured to calculate a Hamming distance between a fingerprint of a next audio stream segment and a fingerprint of previous matching streaming media, to obtain a matching degree between the next audio stream segment and the previous matching streaming media, determine whether the matching degree is greater than a preset threshold, and if the matching degree is greater than the preset threshold, set matching streaming media of the next audio stream segment to the previous matching streaming media by using the result returning module; or if the matching degree is less than the preset threshold, end displaying of the previous streaming media, and perform streaming media matching again by using the information matching module, where after a piece of matching streaming media is obtained, when the streaming media is tracked subsequently, it only needs to be determined whether the current streaming media is previous matching streaming media, and if the current streaming media is the previous matching streaming media, a result may be directly returned; or if the current streaming media is not the previous matching streaming media, streaming media matching is performed again; because a fingerprint of the current streaming media only needs to match a fingerprint of the previous streaming media, occupied memory is less, a calculation speed is improved, not only calculation complexity of streaming media matching is greatly reduced, but also a stable streaming media matching result can be achieved, and a situation that a matching result displayed to a user is unstable is effectively avoided, for example, when matching is performed on a same piece of streaming media, former and latter matching results are changed frequently, which improves searching accuracy; in addition, effects of an external audio on matching accuracy of streaming media in a streaming media playback process can be effectively reduced, such as an occasional talk of a moderator or a brief advertisement during playback of streaming media.

The result returning module 95 is configured to set second streaming media information of the next audio stream segment to streaming media information matching the currently played audio stream segment.

According to the method and the system for tracking audio streaming media in the present disclosure, after streaming media is identified, it is determined whether current streaming media is previous matching streaming media, and if the current streaming media is the previous matching streaming media, a result may be directly returned; or if the current streaming media is not the previous matching streaming media, streaming media matching is performed again. Because a fingerprint of the current streaming media only needs to match a fingerprint of the previous streaming media, occupied memory is less, a calculation speed is improved, not only calculation complexity of streaming media matching is greatly reduced, but also a stable streaming media matching result can be achieved, a situation that a matching result displayed to a user is unstable is effectively avoided, and matching accuracy is improved; effects of an external audio on streaming media matching accuracy in a streaming media playback process can be effectively reduced, and user experience is improved.

The system for tracking audio streaming media provided in this embodiment of the present disclosure is formed in a terminal, and the terminal is, for example, a computer, a tablet computer, and a mobile phone having a touch function. The system for tracking audio streaming media and the method for tracking audio streaming media in the foregoing embodiment belong to a same idea. Any method provided in the embodiments of the methods for tracking audio streaming media may be performed in the system for tracking audio streaming media. For a specific implementation procedure, specifically refer to the embodiments of the methods for tracking audio streaming media, and details are not described herein again.

It should be noted that, for the method for tracking audio streaming media in the embodiments of the present disclosure, people of ordinary skill in the art may understand that, all or some of the procedures of the method for tracking audio streaming media in the embodiments of the present disclosure may be implemented by a computer program controlling relevant hardware. The computer program may be stored in a computer readable storage medium, for example, stored in a memory of the terminal, and is executed by at least one processor in the terminal. The execution process may include the procedures of the embodiments of the methods. The storage medium may be a magnetic disk, an optical disc, a read-only memory (ROM), or a random access memory (RAM).

Functional modules of the system for tracking audio streaming media in the embodiments of the present disclosure may be integrated into one processing chip, or each of the modules may exist alone physically, or two or more modules are integrated into one module. The integrated module may be implemented in a form of hardware, or may be implemented in a form of a software functional module. When the integrated module is implemented in a form of a software functional module and sold or used as an independent product, the module may be stored in a computer-readable storage medium, and the storage medium is, for example, an ROM, a magnetic disk, or an optical disc.

To sum up, although the present disclosure is described above by using preferred embodiments, the preferred embodiments are not intended to limit the present disclosure. Various variations and modifications can be made by persons of ordinary skill in the art without departing from the spirit and scope of the present disclosure. Therefore, the protection scope of the present disclosure shall be subject to the scope defined by the claims.

What is claimed is:

1. A method for tracking audio streaming media, comprising:
at a computer having a display, one or more processors and memory for storing a plurality of program modules to be executed by the one or more processors:
receiving an audio stream;
segmenting the audio stream into multiple audio stream segments including a currently played audio stream segment and a next audio stream segment, wherein the two consecutive segments are separated by a time interval;
identifying first streaming media information corresponding to the currently played audio stream segment by using its audio fingerprint, and using the first streaming media information for representing the currently played audio stream segment, the audio fingerprint being a content-based digital signature representing an acoustic feature of the currently played audio stream segment, wherein the identifying step further comprises:
performing framing process on an audio signal of the currently played audio stream segment to acquire multiple framing spectrum diagrams;
detecting a key frame among the framing spectrum diagrams by using a start point detection algorithm, and reserving the framing spectrum diagram corresponding to the key frame and discarding the other framing spectrum diagrams;
acquiring an audio fingerprint of the key frame from the framing spectrum diagram corresponding to the key frame, and comparing the audio fingerprint of the key frame with pre-stored audio sub-fingerprints to acquire an accurate matching audio sub-fingerprint from the pre-stored audio sub-fingerprints; and
identifying, along a timeline defined by the pre-stored audio sub-fingerprints, streaming media information corresponding to the accurate matching audio sub-fingerprint as the first streaming media information corresponding to the currently played audio stream segment;
displaying the first streaming media information on the display of the computer;
calculating a Hamming distance between an audio fingerprint of the next audio stream segment and the audio fingerprint of the accurate matching audio sub-fingerprint corresponding to the first streaming media information, so as to obtain a matching degree between the next audio stream segment and the first streaming media information;
determining whether the matching degree is greater than a preset threshold;
when the matching degree is less than the preset threshold, identifying second streaming media information corresponding to the next audio stream segment according to the step of identifying the first streaming media information corresponding to the currently played audio stream segment;
when the matching degree is greater than the preset threshold, choosing the first streaming media information as the second streaming media information; and
replacing the first streaming media information displayed on an interface with the second streaming media information.

2. The method for tracking audio streaming media according to claim 1, further comprising:
performing discrete cosine transform (DCT) on the key frame after the framing spectrum diagram corresponding to the key frame is reserved, and reserving a DCT coefficient; and
representing the reserved DCT coefficient by using a binary system, and converting, by using a minimum hash algorithm, the DCT coefficient represented by using the binary system into the audio fingerprint.

3. The method for tracking audio streaming media according to claim 1, wherein the step of identifying first streaming media information corresponding to a currently played audio stream segment by using its audio fingerprint comprises:
dividing the audio fingerprint into a preset number of audio sub-fingerprints, and storing the preset number of audio sub-fingerprints into a hash sub-table;
calculating the numbers of occurrences of the audio sub-fingerprints, and deleting an audio sub-fingerprint whose number of occurrences is less than a matching threshold; and
comparing the audio fingerprint of the currently played audio stream segment with the reserved audio sub-fingerprints, and generating a matching error according to a Hamming distance between the reserved audio sub-fingerprints and the audio fingerprint of the audio stream segment, so as to acquire an accurate matching audio sub-fingerprint.

4. The method for tracking audio streaming media according to claim 3, further comprising:
  after the accurate matching audio sub-fingerprint is acquired, combining, on a timeline by using a dynamic programming algorithm or a straight line detection algorithm, streaming media information corresponding to the accurate matching audio sub-fingerprint, so as to generate the first streaming media information corresponding to the currently played audio stream segment.

5. A computer system for tracking audio streaming media, comprising:
  one or more processors;
  a display;
  memory; and
  a plurality of program modules stored in the memory and to be executed by the one or more processors, the plurality of program modules further including:
    an audio processing module, configured to receive and segment an audio stream into multiple audio stream segments including a currently played audio stream segment and a next audio stream segment, wherein the two consecutive segments are separated by a time interval;
    an information matching module, configured to identify first streaming media information corresponding to the currently played audio stream segment by using its audio fingerprint, and using the first streaming media information for representing the currently played audio stream segment, the information matching module further comprising:
      a spectrum diagram extraction unit, configured to perform framing process on an audio signal of the currently played audio stream segment, so as to acquire multiple framing spectrum diagrams;
      a key frame detection unit, configured to detect a key frame among the framing spectrum diagrams by using a start point detection algorithm, and reserve the framing spectrum diagram corresponding to the key frame and discard the other framing spectrum diagrams;
      a fingerprint determining unit, configured to acquire an audio fingerprint of the key frame from the framing spectrum diagram corresponding to the key frame, and compare the audio fingerprint of the key frame with pre-stored audio sub-fingerprints to acquire an accurate matching audio sub-fingerprint from the pre-stored audio sub-fingerprints; and
      an information matching unit, configured to identify, along a timeline defined by the pre-stored audio sub-fingerprints, streaming media information corresponding to the accurate matching audio sub-fingerprint as the first streaming media information corresponding to the currently played audio stream segment;
    a matching degree determining module, configured to calculate a Hamming distance between an audio fingerprint of the next audio stream segment and the audio fingerprint of the accurate matching audio sub-fingerprint corresponding to the first streaming media information so as to obtain a matching degree between the next audio stream segment and the first streaming media information and determine whether the matching degree between the next audio stream segment and the first streaming media information is greater than a preset threshold, the information matching module being further configured to: when the matching degree is less than the preset threshold, identify second streaming media information corresponding to the next audio stream segment according to the step of identifying the first streaming media information corresponding to the currently played audio stream segment;
    a result returning module, configured to: when the matching degree is greater than the preset threshold, choose the first streaming media information as the second streaming media information and replace the first streaming media information displayed on an interface with the second streaming media information; and
    an information display module, configured to: after the first streaming media information is identified, display the first streaming media information, and after the result returning module chooses the first streaming media information as the second streaming media information, display the second streaming media information.

6. The computer system for tracking audio streaming media according to claim 5, wherein the information matching module further comprises:
  a discrete cosine transform (DCT) unit, configured to perform DCT on the key frame, and reserve a DCT coefficient; and
  a fingerprint conversion unit, configured to represent the reserved DCT coefficient by using a binary system, and convert, by using a minimum hash algorithm, the DCT coefficient represented by using the binary system into the audio fingerprint.

7. The system for tracking audio streaming media according to claim 6, wherein the information matching module further comprises:
  a fingerprint matching unit, configured to divide the audio fingerprint into a preset number of audio sub-fingerprints, store the preset number of audio sub-fingerprints into a hash sub-table, calculate the numbers of occurrences of the audio sub-fingerprints, and delete an audio sub-fingerprint whose number of occurrences is less than a matching threshold; and
  a fingerprint determining unit, configured to compare the audio fingerprint of the currently played audio stream segment with the reserved audio sub-fingerprints, and generate a matching error according to a Hamming distance between the reserved audio sub-fingerprints and the audio fingerprint of the audio stream segment, so as to acquire an accurate matching audio sub-fingerprint.

8. The system for tracking audio streaming media according to claim 7, wherein the information matching module further comprises:
  an information matching unit, configured to combine, on a timeline by using a dynamic programming algorithm or a straight line detection algorithm, streaming media information corresponding to the accurate matching audio sub-fingerprint, to generate the first streaming media information corresponding to the currently played audio stream segment.

9. A non-transitory computer readable storage medium, internally storing a processor executable instruction, the processor executable instruction being used for enabling a processor of a computer system to perform the following operations:
  receiving an audio stream;
  segmenting the audio stream into multiple audio stream segments including a currently played audio stream segment and a next audio stream segment, wherein the two consecutive segments are separated by a time interval;

identifying first streaming media information corresponding to the currently played audio stream segment by using its audio fingerprint, and using the first streaming media information for representing the currently played audio stream segment, the audio fingerprint being a content-based digital signature representing an acoustic feature of the currently played audio stream segment, wherein the identifying step further comprises:

performing framing process on an audio signal of the currently played audio stream segment to acquire multiple framing spectrum diagrams;

detecting a key frame among the framing spectrum diagrams by using a start point detection algorithm, and reserving the framing spectrum diagram corresponding to the key frame and discarding the other framing spectrum diagrams;

acquiring an audio fingerprint of the key frame from the framing spectrum diagram corresponding to the key frame, and comparing the audio fingerprint of the key frame with pre-stored audio sub-fingerprints to acquire an accurate matching audio sub-fingerprint from the pre-stored audio sub-fingerprints; and identifying, along a timeline defined by the pre-stored audio sub-fingerprints, streaming media information corresponding to the accurate matching audio sub-fingerprint as the first streaming media information corresponding to the currently played audio stream segment;

displaying the first streaming media information on a display of the computer system;

calculating a Hamming distance between an audio fingerprint of the next audio stream segment and the audio fingerprint of the accurate matching audio sub-fingerprint corresponding to the first streaming media information, so as to obtain a matching degree between the next audio stream segment and the first streaming media information;

determining whether the matching degree between a next audio stream segment and the first streaming media information is greater than a preset threshold;

when the matching degree is less than the preset threshold, identify second streaming media information corresponding to the next audio stream segment according to the step of identifying the first streaming media information corresponding to the currently played audio stream segment;

when the matching degree is greater than the preset threshold, choosing the first streaming media information as the second streaming media information; and replacing the first streaming media information displayed on an interface with the second streaming media information.

10. The non-transitory computer readable storage medium according to claim 9, wherein the operations further comprise:

performing discrete cosine transform (DCT) on the key frame after the framing spectrum diagram corresponding to the key frame is reserved, and reserving a DCT coefficient; and representing the reserved DCT coefficient by using a binary system, and converting, by using a minimum hash algorithm, the DCT coefficient represented by using the binary system into the audio fingerprint.

11. The non-transitory computer readable storage medium according to claim 9, wherein the step of identifying first streaming media information corresponding to a currently played audio stream segment by using its audio fingerprint further comprises:

dividing the audio fingerprint into a preset number of audio sub-fingerprints, and storing the preset number of audio sub-fingerprints into a hash sub-table;

calculating the numbers of occurrences of the audio sub-fingerprints, and deleting an audio sub-fingerprint whose number of occurrences is less than a matching threshold; and comparing the audio fingerprint of the currently played audio stream segment with the reserved audio sub-fingerprints, and generating a matching error according to a Hamming distance between the reserved audio sub-fingerprints and the audio fingerprint of the audio stream segment, so as to acquire an accurate matching audio sub-fingerprint.

12. The non-transitory computer readable storage medium according to claim 11, wherein the step of identifying first streaming media information corresponding to a currently played audio stream segment by using its audio fingerprint further comprises:

after the accurate matching audio sub-fingerprint is acquired, combining, on a timeline by using a dynamic programming algorithm or a straight line detection algorithm, streaming media information corresponding to the accurate matching audio sub-fingerprint, so as to generate the first streaming media information corresponding to the currently played audio stream segment.

* * * * *